Patented Aug. 9, 1932

1,870,270

UNITED STATES PATENT OFFICE

ROBERT M. WASHBURN, OF EVANSTON, ILLINOIS, ASSIGNOR, BY DIRECT AND MESNE ASSIGNMENTS, TO DEE-HY PRODUCTS COMPANY, OF CHICAGO, ILLINOIS, A CORPORATION OF DELAWARE

PREPARATION OF DRY NONHYGROSCOPIC CRUDE LACTOSE

No Drawing.  Application filed January 12, 1929.  Serial No. 332,237.

This invention has for its object the production of dry, non-hygroscopic crude lactose or albumen free whey powder.

The solids of fresh sweet milk consist chiefly of fat, casein, albumen, lactose or milk sugar and mineral salts.

The fat is separated as cream and leaving skim milk containing the remaining milk solids.

Casein is usually separated by allowing the skim milk to sour by the conversion bacterially of a part of the lactose into lactic acid and then applying heat to the conversion mass.

Albumen may be precipitated by the application of heat and such precipitation takes place whether the milk or whey is acid or not, although, the physical character of the precipitate formed is largely affected by the degree of acidity.

If the resulting whey, after the fat, casein and albumen have been eliminated, is reduced to dryness it is hygroscopic and becomes sticky when exposed to the air.

Furthermore in the manufacture of all cheese whey results. 100 parts of natural milk will yield about 10 parts of cheese and leave 90 parts of whey. All such whey contains a considerable amount of acid, especially if the cheese made is of the ordinary American cheese variety. Also, the cheese whey will sour rapidly after being made, and thus it is found that common whey contains from 0.40% to 0.75% acid.

I have found that the cause of the hygroscopic property of dry lactose formed from whey is the lactic acid contained therein and, if such acid is substantially eliminated by neutralization, the resulting dry lactose is substantially non-hygroscopic.

The presence of excessive lactic acid, in a skim-milk whey for example, may be largely avoided by promptly separating the cream from the sweet milk and then equally promptly precipitating the casein by means of a ferment, such as rennin or pepsin.

Almost universally, however, the precipitation of the commercial casein is brought about by acid, usually lactic acid produced in the milk from the lactose by bacteria. The precipitation is aided by heat, which causes the soft diffuse casein precipitate to collect into definite masses and particles and progressively contract and harden as the temperature is continued and/or increased.

Albumen does not begin to be precipitated until around 146° to 147° F. and such precipitation takes place whether acid is present or not.

Hence, in order to prepare casein substantially free from albumen the milk should not, prior to the separation of the casein, be heated much above 150° F. This prohibition applies not merely to the degree of heat used in precipitating the casein, but also to the temperature of pasteurizing the sweet or low acid milk, if such is done.

The lowest acidity at which casein is precipitated is ordinarily around 0.30 to 0.35% total acidity. Usually higher acidities are used, especially in the case of skim-milk, since with the latter when the total acidity is below 0.60 to 0.65% the casein ordinarily precipitates in rubbery masses often in commercial practice a foot or more in diameter. Such rubbery masses are apt to be produced even with acidities over 0.60 to 0.65% unless the milk is violently agitated while heated unless the acidity is exceptionally high, say around 1.5 to 2% calculated as lactic acid.

Usually, therefore, for separating the casein the milk is soured to 0.50 to 0.60% total acidity.

While albumen begins to precipitate at 146° to 147° F. the precipitation below 160° F. is relatively slow and I prefer to heat to 190° or more to bring about the precipitation.

After the casein has been removed with acid and heat, the whey remaining will have an acidity of about three-fifths that of the milk while the casein was in it. But the acidity in the whey increases rapidly, due to the further development of lactic acid bacteria.

I have further found that the physical character of the albumen precipitate from whey is greatly affected by the acidity of the whey. With acidities around 0.40 to 0.60% total acidity the albumen is precipitated in a finely divided form not readily separated from the whey. If, on the other hand, such acid is largely or wholly neutralized, prior to heating to precipitate the albumen, the latter separates as large flocs or curds which rise to the surface of the whey and may be readily skimmed off.

Hence it is desirable to neutralize the acid of the whey prior to the separation of the albumen and then promptly follow such separation with the desiccation of the albumen-free whey to avoid further production of lactic acid.

To obtain dry non-hygroscopic lactose the total acidity of the whey before heating to remove the albumen should not be greatly in excess of 0.10% and it is better to have it as low as 0.06%. After the albumen has been precipitated out the remaining liquid will show about 0.02 to 0.03% acid.

This may be accomplished by the addition of any suitable alkaline material, lime for example, in the requisite quantity to neutralize the acid present.

The desiccation of the whey is preferably carried out by spraying the albumen free whey into a current of heated air not only for convenience in obtaining a product that does not require subsequent drying and grinding, but also because in such drying process there is little or no inversion or other change in the lactose.

When whey is powdered containing both the albumen and the acid the resulting powder is very prone to develop an offensive odor, whereas with the albumen removed and the acid neutralized the powder retains its sweet characteristics, and is suitable for human food purposes.

Preferably the procedure is to start with common cheese whey, or commercial casein whey, thence allow the whey to sour to a total acidity of 0.40% to 0.60% measured as lactic acid, then to neutralize the acidity to about 0.10% total acidity and heat to 185° F. or more to precipitate the albumen, skim and strain, filter or centrifuge to remove the finer particles of remaining albumen and finally spray dry the albumen free whey.

After the acid has been neutralized completely, or to the desired extent steam is blown directly into the whey until the latter is boiling hot. Steam is then shut off and the tank of whey allowed to remain quiet for a few minutes or until the albumen curds have floated to the surface. These curds are then skimmed off and cooled to prevent souring. This albuminous curdy material being rich in food constituents is then ready to be used as a human food especially by being incorporated with other cheese.

The aqueous solution remaining after the albuminous curd has been removed, is then run through a fine cloth strainer or through a centrifugal clarifying device for the removal of the last traces of curdled albumen.

The clear whey remaining then consists of about 5% lactose, 0.04% mineral salts, 0.03% total titratable acid and the balance water. The clear liquid is now ready to be dried to a powder by any suitable means. The powder will be found to be free from bad odor and have only slight hygroscopicity and be almost pure white in color.

If, because of adverse storage conditions, or by deliberate intent, the powdered lactose does become caked due to the small amount of moisture absorbed, it is desirable to allow it to fully satisfy its affinity for moisture and to become quite completely solidified, and then to pulverize the cake in a suitable mill, when it will be found that the powdered grains will not again form into a cake.

The final product consists of about 88 to 90% lactose, 9% mineral salts and the balance moisture. It is readily soluble, of good taste and valuable for making bakery products and confectionery.

I am aware that numerous details of the process may be varied through a wide range without departing from the spirit of this invention and I do not desire limiting the patent otherwise than as necessitated by the prior art.

I claim as my invention:

1. The hereindescribed method of reducing whey to powdered form, which comprises removing albumen from the whey, extracting moisture therefrom, subjecting the dried product to moisture to satisfy its affinity therefor and forming the product into a cake and finally reducing the cake to powdered form.

2. The herein described method of reducing whey to powder form which consists in removing albumen by boiling and skimming the whey, extracting the moisture of the whey, subjecting the product to pure, odorless moisture to satisfy its affinity therefor and form the product into a cake, and finally reducing the cake to powder form.

3. The herein described method of producing an odorless powder from whey which consists in boiling the whey to bring the albumen content to the surface thereof, subsequently removing the albumen, neutralizing the whey, thereafter extracting the moisture of the whey to form a powder, subjecting the powder to the action of water to satisfy its affinity therefor and produce a cake, and finally reducing said cake to a finely comminuted state.

In testimony whereof I have hereunto subscribed my name at Chicago, Cook County Ill.

ROBERT M. WASHBURN.